(12) United States Patent
Jiao et al.

(10) Patent No.: US 12,347,618 B2
(45) Date of Patent: Jul. 1, 2025

(54) NICKEL FOAM-SUPPORTED DEFECTIVE TRICOBALT TETROXIDE NANOMATERIAL, LOW TEMPERATURE RESISTANT SUPERCAPACITOR AND PREPARATION METHOD THEREOF

(71) Applicant: ZHEJIANG NORMAL UNIVERSITY, Jinhua (CN)

(72) Inventors: Yang Jiao, Jinhua (CN); Jianrong Chen, Jinhua (CN); Hongjun Lin, Jinhua (CN); Yan Xu, Jinhua (CN); Yanchao Xu, Jinhua (CN)

(73) Assignee: ZHEJIANG NORMAL UNIVERSITY, Jinhua (CN)

( * ) Notice: Subject to any disclaimer, the term of this patent is extended or adjusted under 35 U.S.C. 154(b) by 404 days.

(21) Appl. No.: 17/779,235

(22) PCT Filed: Jan. 14, 2021

(86) PCT No.: PCT/CN2021/071737
§ 371 (c)(1),
(2) Date: May 24, 2022

(87) PCT Pub. No.: WO2022/012008
PCT Pub. Date: Jan. 20, 2022

(65) Prior Publication Data
US 2022/0406533 A1    Dec. 22, 2022

(30) Foreign Application Priority Data

Jul. 17, 2020   (CN) .......................... 202010693487.1

(51) Int. Cl.
*H01G 11/86*    (2013.01)
*C01G 51/04*    (2025.01)
*H01G 11/46*    (2013.01)

(52) U.S. Cl.
CPC ............. *H01G 11/86* (2013.01); *C01G 51/04* (2013.01); *H01G 11/46* (2013.01);
(Continued)

(58) Field of Classification Search
CPC ............................. C01G 51/04; C01P 2005/03
See application file for complete search history.

(56) References Cited

U.S. PATENT DOCUMENTS

| | | | | |
|---|---|---|---|---|
| 2006/0060998 | A1* | 3/2006 | Strouse | C01G 3/00 264/489 |
| 2017/0053750 | A1* | 2/2017 | Shim | H01G 11/70 |
| 2019/0376195 | A1* | 12/2019 | Aziz | C25B 11/051 |

FOREIGN PATENT DOCUMENTS

| CN | 103359796 A | 10/2013 |
|---|---|---|
| CN | 103950993 A * | 7/2014 |

(Continued)

OTHER PUBLICATIONS

International Search Report dated Apr. 15, 2021 received in International Application No. PCT/CN2021/071737.

*Primary Examiner* — Dah-Wei D. Yuan
*Assistant Examiner* — Kristen A Dagenais
(74) *Attorney, Agent, or Firm* — Scully, Scott, Murphy & Presser, P.C.

(57) ABSTRACT

The present invention relates to the field of electrode material of a low temperature resistant supercapacitor, and in particular to a nickel foam-supported defective tricobalt tetroxide nanomaterial, a low temperature resistant supercapacitor and a preparation method thereof. The method includes the following steps: dissolving cobalt acetate in an ethylene glycol solution and stirring uniformly to obtain a pink transparent solution; adding hexadecyl trimethyl ammonium bromide to the pink transparent solution, and stirring until the hexadecyl trimethyl ammonium bromide dissolves to obtain a mixed solution; putting the mixed (Continued)

solution into a teflon-lined reactor, adding pretreated nickel foam for hydrothermal reaction, taking out the nickel foam after the reaction is completed, and ultrasonic cleaning the nickel foam repeatedly before drying; and heat-treating the nickel foam obtained after drying. The defective tricobalt tetroxide (D-$Co_3O_4$) grown on the nickel foam prepared by the present invention still has a high specific capacity at a low temperature, and the assembled supercapacitor can withstand low temperature, and thus has great application prospects.

6 Claims, 5 Drawing Sheets

(52) U.S. Cl.
CPC ...... *C01P 2002/72* (2013.01); *C01P 2004/03* (2013.01); *C01P 2004/04* (2013.01); *C01P 2006/40* (2013.01)

(56) References Cited

FOREIGN PATENT DOCUMENTS

| | | | | | |
|---|---|---|---|---|---|
| CN | 111056574 | A | * | 4/2020 | ............. B82Y 30/00 |
| CN | 112053856 | A | | 12/2020 | |

* cited by examiner

NICKEL FOAM-SUPPORTED DEFECTIVE TRICOBALT TETROXIDE NANOMATERIAL, LOW TEMPERATURE RESISTANT SUPERCAPACITOR AND PREPARATION METHOD THEREOF

TECHNICAL FIELD

The present invention relates to the field of electrode material of a supercapacitor, and in particular to a nickel-foam supported defective tricobalt tetroxide nanomaterial, a low temperature resistant supercapacitor and a preparation method thereof.

BACKGROUND

With social and economic development, as a new type of green energy storage device, supercapacitors have a series of advantages such as high power density, long cycle life, fast charging and discharging rate, being green and pollution-free, safe and portable, etc., and they have received widespread attention from researchers and have experienced rapid development. The performance of supercapacitor is mainly determined by the electrode material. Therefore, an ideal low temperature resistant electrode material can be obtained through reasonable design, which can withstand harsh temperature conditions, store energy stably at low temperatures, and achieve high energy storage and long cycle life.

As a new type of green energy storage device, supercapacitors have a series of advantages such as high power density, long cycle life, fast charging and discharging rate, green and pollution-free, safe and portable, etc., and they have received widespread attention from researchers and have experienced rapid development. The performance of supercapacitor is mainly determined by the electrode material. Therefore, an ideal low temperature resistant electrode material can be obtained through reasonable design, which can withstand harsh temperature conditions, store energy stably at low temperatures, and achieve high energy storage and long cycle life.

Tricobalt tetroxide ($Co_3O_4$) is an important inorganic p-type semiconductor metal oxide, which is widely used in fields such as lithium-ion batteries, catalysts, supercapacitors, sensors, and magnetic materials. $Co_3O_4$ has huge potential application value in the field of photocatalysts due to its abundant sources, low price, easy availability, and stable chemical properties. However, the current preparation methods for $Co_3O_4$ are complicated, and the prepared $Co_3O_4$ has poor electrochemical performance and cannot work under low temperature conditions.

SUMMARY

In order to overcome the above technical problems, the present invention proposes to a nickel foam-supported defective tricobalt tetroxide nanomaterial, a low temperature resistant supercapacitor and a preparation method thereof.

In order to achieve the above purpose, the first aspect of the present invention provides a preparation method for a nickel foam-supported defective tricobalt tetroxide nanomaterial, which includes the following steps:

dissolving cobalt acetate in an ethylene glycol solution and stirring uniformly to obtain a pink transparent solution;

adding hexadecyl trimethyl ammonium bromide to the pink transparent solution, and stirring until the hexadecyl trimethyl ammonium bromide dissolves to obtain a mixed solution;

putting the mixed solution into a teflon-lined reactor, and adding pretreated nickel foam for reaction, in which a purple-pink substance is grown on the surface of the nickel foam after reaction, and the nickel foam is washed repeatedly before being dried;

heat-treating the nickel foam composite material obtained after drying.

A second aspect of the present invention provides a nickel foam-supported defective tricobalt tetroxide nanomaterial prepared by the above preparation method.

A third aspect of the present invention provides a supercapacitor, which contains the nickel foam-supported defective tricobalt tetroxide nanomaterial described above.

In addition, the above method for preparing a nickel foam-supported defective tricobalt tetroxide nanomaterial according to the present invention may also have the following additional technical features.

According to an embodiment of the present invention, the step of pretreating the nickel foam includes:

cutting the nickel foam into pieces, ultrasonic cleaning the pieces in hydrochloric acid, ethanol and an aqueous solution in sequence, and then drying them.

According to an embodiment of the present invention, a drying temperature in the step of pretreating the nickel foam is 60-80° C.

According to an embodiment of the present invention, a duration of the ultrasonic clean is 10-15 minutes.

According to an embodiment of the present invention, process conditions of the heat-treating are as follows: the temperature is controlled at 500-700° C., a heating rate is controlled at 2-5 $min^{-1}$, and a treatment time is controlled at 2-5 hours.

According to an embodiment of the present invention, a reaction temperature in the reactor is 200-300° C., and a reaction time is 8-10 hours.

As compared with the prior art, the present invention has the following advantages:

1. the preparation process of the present invention is simple, safe and pollution-free;
2. the nickel foam-supported defective tricobalt tetroxide nanomaterial can expose more electrochemical reaction sites, and has high conductivity and stability;
3. the nickel foam-supported defective tricobalt tetroxide (D-$Co_3O_4$) prepared by the present invention has good wettability in water, which is advantageous for effective diffusion of electrode solution ions and improves the electrochemical reaction rate;
4. the nickel foam-supported defective tricobalt tetroxide (D-$Co_3O_4$) prepared by the present invention still has a high specific capacity at a low temperature, and the assembled supercapacitor can withstand low temperature, and thus has great application prospects.

BRIEF DESCRIPTION OF THE DRAWINGS

Upon reading the detailed description of preferred embodiments below, various other advantages and benefits will become clear to those skilled in the art. The drawings are only used for the purpose of illustrating the preferred embodiments, and should not be considered as a limitation to the present invention. Moreover, throughout the drawings, identical components are denoted by identical reference signs. In the drawings.

DETAILED DESCRIPTION

Figure 1:
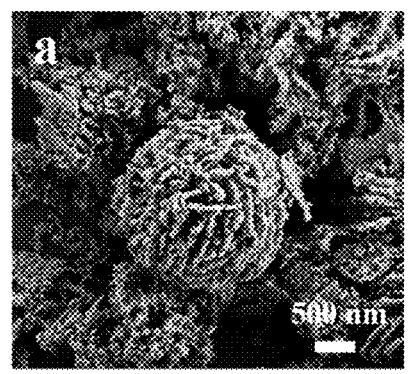
FIG. 1 is a scanning electron microscopy image of a nickel foam-supported tricobalt tetroxide nanomaterial prepared in Example 1 of the present invention.

In order to make the purpose, technical solutions and advantages of the present invention clearer, the present invention will be described in further detail below with reference to the accompanying drawings and examples. It should be understood that the specific examples described herein are only used to explain the present invention, not to limit the present invention.

The defective tricobalt tetroxide nanomaterial in the present invention means that the crystal lattice of tricobalt tetroxide is distorted.

Example 1

This example relates to a method for preparing a low temperature resistant nickel foam-supported defective tricobalt tetroxide nanomaterial, which includes the following steps.

1. The nickel foam was cut into pieces with an area of 1×2 cm$^2$, ultrasonic cleaned in 3M hydrochloric acid, ethanol and an aqueous solution in sequence, the cleaning time was 10 minutes, respectively; and then the treated nickel foam was placed into a 60° C. oven for drying, so that a clean nickel foam-based material was finally obtained;
2. A certain amount of cobalt acetate was dissolved in 30 mL of ethylene glycol solution and was stirred uniformly to obtain a pink transparent solution;
3. Hexadecyl trimethyl ammonium bromide (abbreviated as CTAB) was added to the solution prepared in step 2, and was stirred until it was completely dissolved;
4. The mixed solution in step 2 was transferred to a teflon-lined reactor, and the nickel foam obtained in step 1 was added to the reactor to react at 200° C. for 8 hours. After the reactor was cooled to room temperature, a purple-pink substance was grown on the surface of the nickel foam after reaction, and the nickel foam was ultrasonic cleaned with absolute ethanol and distilled water repeatedly before being dried;
5. The nickel foam composite material was heat-treated at a temperature of 500° C. for 2 hours with a heating rate being controlled at 2° C. min$^{-1}$, so as to finally obtain the nickel foam-supported defective tricobalt tetroxide nanomaterial (D-Co$_3$O$_4$).

Example 2

1. The nickel foam was cut into pieces with an area of 1×2 cm$^2$, ultrasonic cleaned in 3M hydrochloric acid, ethanol and an aqueous solution in sequence, the cleaning time was 10 minutes, respectively; and then the treated nickel foam was placed in a 80° C. oven for drying, so that a clean nickel foam-based material was finally obtained;
2. A certain amount of cobalt acetate was dissolved in 30 mL of ethylene glycol solution and was stirred uniformly to obtain a pink transparent solution;
3. Hexadecyl trimethyl ammonium bromide (abbreviated as CTAB) was added to the solution prepared in step 2, and was stirred until it was completely dissolved;
4. The mixed solution in step 2 was transferred to a teflon-lined reactor, and the nickel foam obtained in step 1 was added to the reactor to react at 300° C. for 10 hours;
5. After the reactor was cooled to room temperature, a purple-pink substance was grown on the surface of the nickel foam after reaction to obtain purple-pink nickel foam, and the nickel foam was ultrasonic cleaned with absolute ethanol and distilled water repeatedly before being dried;
6. heat-treating the nickel foam composite material at a temperature of 700° C. for 5 hours with a heating rate being controlled at 5° C. min$^{-1}$, so as to finally obtain the nickel foam-supported defective tricobalt tetroxide nanomaterial (D-Co$_3$O$_4$).

Example 3

As compared with Example 1, the difference was that no CTAB was added in step 3 of Example 3, and other steps and process conditions were the same as those in Example 1, so as to obtain nickel foam-supported non-defective tricobalt tetroxide (Co$_3$O$_4$).

Comparative Experiments

Figure 2:
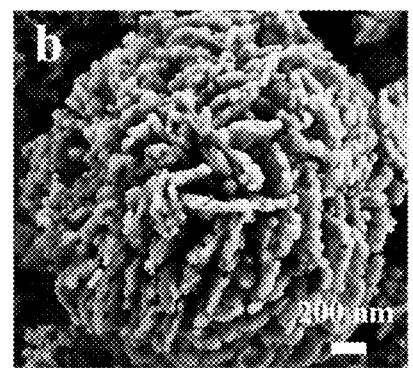
FIG. 2 is a scanning electron microscopy image of a nickel foam-supported tricobalt tetroxide nanomaterial prepared in Example 3 of the present invention.

1. Collecting Scanning Electron Microscopy Images and Transmission Electron Microscopy Images of the Materials Scanning electron microscopy images and transmission electron microscopy images of the nickel foam-supported tricobalt tetroxide nanomaterials prepared in Examples 1 and 3 were taken respectively, as specifically shown in FIGS. 1-2, from which it can be seen that the nickel foam-supported tricobalt tetroxide nanomaterials prepared in Examples 1 and 3 have similar morphologies, each being a petal-like morphology assembled from unique nanosheets.

Figure 3:
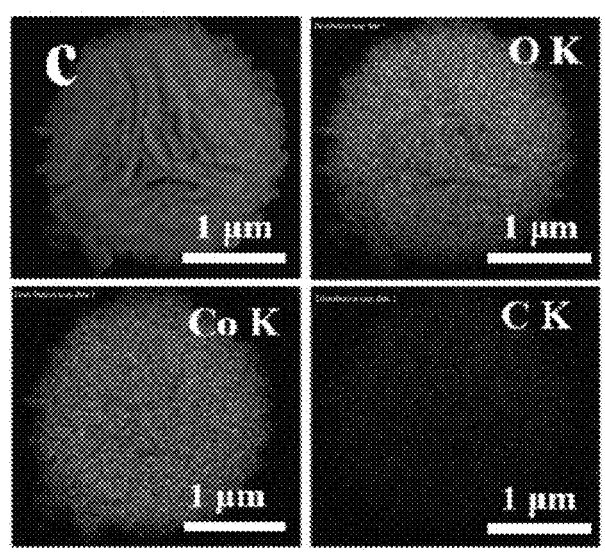
FIG. 3 is a surface scanning image of scanning electron microscopy of the nickel foam-supported tricobalt tetroxide nanomaterials obtained in Example 1 and 3 of the present invention after calcination.
Figure 4:
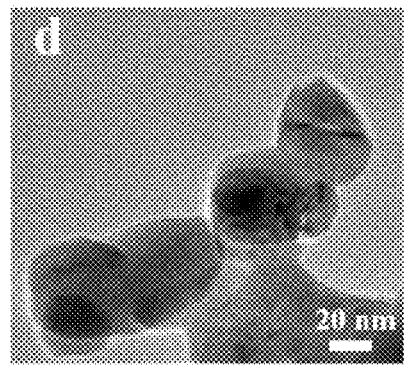
FIG. 4 is a transmission electron microscopy image of the nickel foam-supported tricobalt tetroxide nanomaterial obtained in Example 1 of the present invention after calcination.
Figure 5:
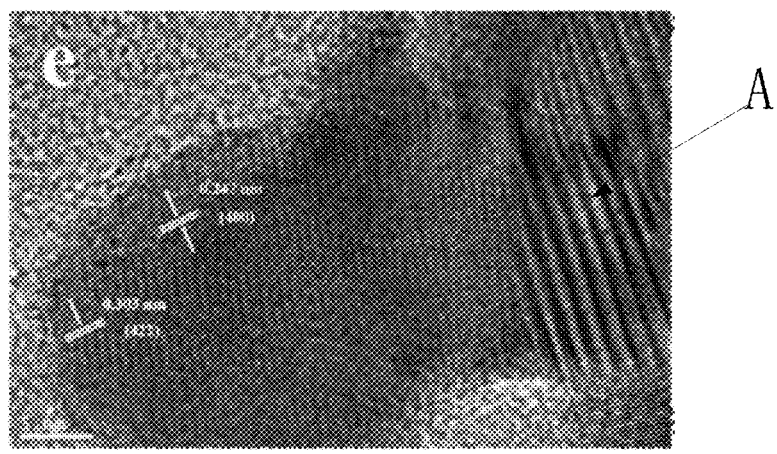
FIG. 5 is a high resolution transmission electron microscopy image of the nickel foam-supported tricobalt tetroxide nanomaterial obtained in Example 1 of the present invention after calcination.
Figure 6:
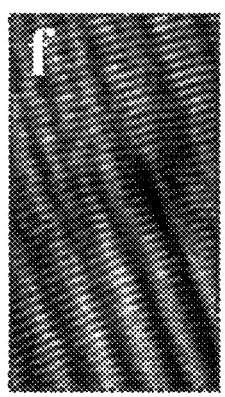
FIG. 6 is a partially enlarged image of A in FIG. 5.

2. Collecting Scanning Electron Microscopy Images and Transmission Electron Microscopy Images of the Materials after Calcination The nickel foam-supported tricobalt tetroxide nanomaterials prepared in Examples 1 and 3 were calcinated respectively, and scanning electron microscopy images, transmission electron microscopy images and surface scanning images of scanning electron microscopy of the nickel foam-supported tricobalt tetroxide nanomaterials after calcination were taken, as specifically shown in FIGS. 3-6. The element distribution in FIG. 3 shows that the distribution of C, Co, and O in the material is uniform. It can be seen from FIGS. 4-6 that the surface of the D-$Co_3O_4$ material becomes rougher than that of $Co_3O_4$ synthesized without CTAB added; at the same time, a large number of nanoparticles appears, which is caused by the removal of $CO_2$ and $H_2O$ during the annealing process. In addition, it can be clearly seen from FIG. 6 that there are ordered detachment faults in D-$Co_3O_4$, and these detachment faults are parallel to each other, which is advantageous for improving electrochemical properties.

3. Collecting XRD Patterns

Figure 7:
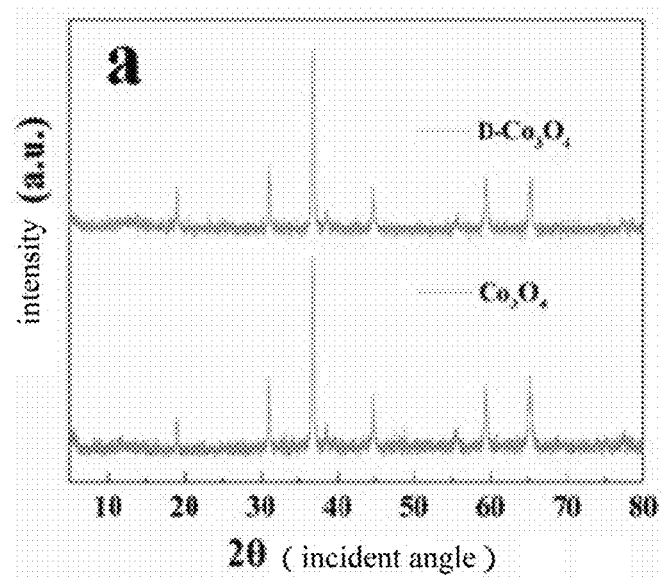
FIG. 7 is a XRD pattern of the nickel foam-supported tricobalt tetroxide nanomaterials obtained in Examples 1 and 3 of the present invention.
Figure 8:
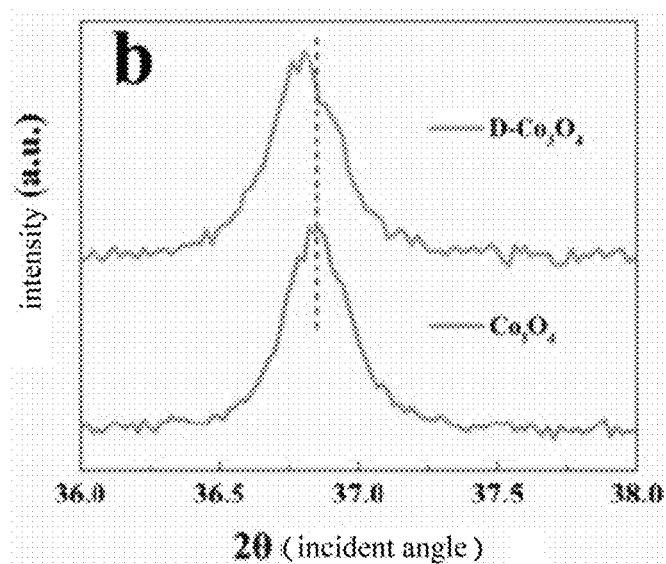
FIG. 8 is a partially enlarged image of FIG. 7.

XRD patterns of the tricobalt tetroxide nanomaterials prepared in Examples 1 and 3 were obtained respectively, as specifically shown in FIGS. 7-8, it can be seen that the D-$Co_3O_4$ and $Co_3O_4$ nanostructures are characterized by X-ray diffraction (XRD). Diffraction peaks of the two nanomaterials both well match with $Co_3O_4$ (PDF #62-3103). The peaks are located at 18.9, 31.1, 36.8, 44.8, 59.2 and 65.2 respectively, which correspond to planes (111), (220), (311), (222), (511) and (440) of $Co_3O_4$ respectively. FIG. 8 is an enlarged XRD spectrum of FIG. 7. As compared with $Co_3O_4$, the (311) diffraction peak of D-$Co_3O_4$ is obviously moved to a lower angle, which is mainly due to the increase of d-spacing caused by lattice distortion. At the same time, the (311) characteristic peak of D-$Co_3O_4$ is obviously broadened, indicating that the lower the nanometer value of the material prepared in Example 1 is, the smaller crystal grains, the larger lattice distortion.

4. Determining Electrochemical Performance

The Shanghai Chenhua CHI 660C electrochemical comprehensive tester was used to test the electrochemical performance. At the same time, the Xinwei charge-discharge tester was used to test the cycle performance of the supercapacitor. In a three-electrode system, a platinum sheet with an area of 2×2 cm$^2$, a double-salt bridge saturated calomel electrode and a KOH aqueous solution with a concentration of 3M were selected as a counter electrode, a reference electrode and an electrolytic solution in the test, respectively. The active material was prepared into an electrode sheet which served as a working electrode to test its electrochemical performance. The test of electrochemical performance mainly includes cyclic voltammetry (CV) curve test, galvanostatic charge and discharge (GCD) test, AC impedance (with an EIS amplitude of 5 mV, and a frequency of 0.01 Hz-100 kHz) test and cycle stability test, etc.

In a two-electrode system, first, the nickel foam-supported tricobalt tetroxide nanomaterials prepared in Examples 1 and 3 were used as the electrode material for charge-matching with the negative electrode material, and then an appropriate electrolytic solution or electrolyte and packaging materials were selected to assemble them into a device. (supercapacitor), so as to test its electrochemical performance under low temperature conditions. The specific capacity of electrode material at different current densities can be calculated according to the discharge time of galvanostatic charge and discharge, and the calculation formula is shown as follows, where $C_s$ is an area specific capacity, with a unit of mF cm$^{-2}$:

$$C_S = \frac{I \times \Delta t}{s \times \Delta V} \quad (1)$$

I: current density, with a unit of mA cm$^{-2}$;
Δt: galvanostatic discharge time, with a unit of s;
ΔV: the window of working potential, with a unit of V;
s: the area of the active material participating in the electrochemical reaction, with a unit of cm$^{-2}$.

Figure 9:
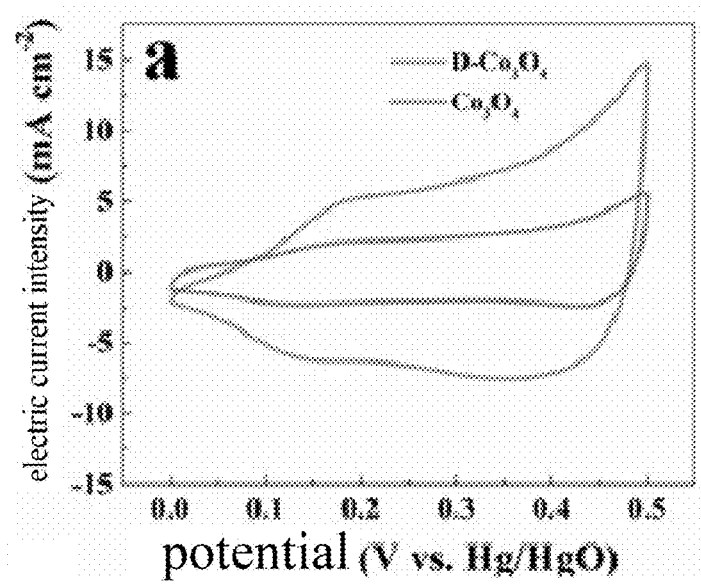
FIG. 9 is a cyclic voltammetry curve of the nickel foam-supported tricobalt tetroxide nanomaterials obtained in Examples 1 and 3 of the present invention at a scan rate of 5 mV s$^{-1}$.
Figure 10:
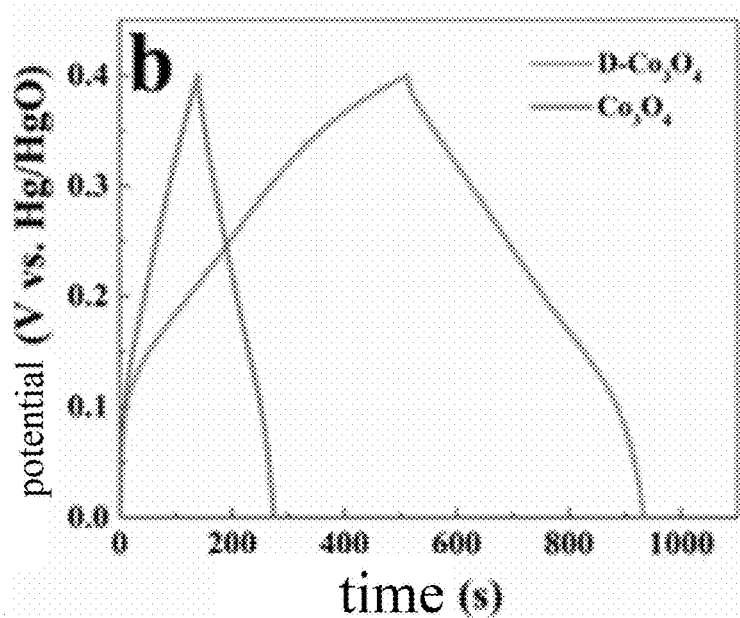
FIG. 10 is a galvanostatic charge and discharge curve of the nickel foam-supported tricobalt tetroxide nanomaterials obtained in Examples 1 and 3 of the present invention when the current density is 1 A g$^{-1}$.
Figure 11:
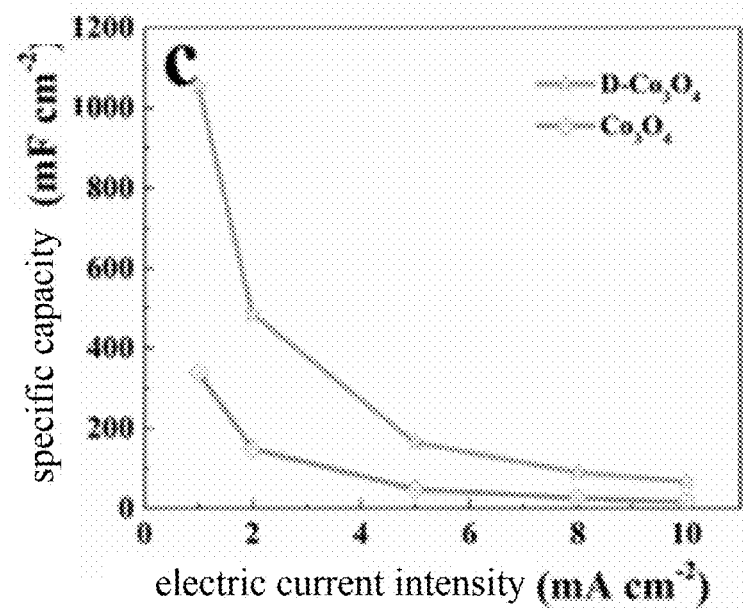
FIG. 11 is a specific capacity of the nickel foam-supported tricobalt tetroxide nanomaterials obtained in Examples 1 and 3 of the present invention under different current densities.
Figure 12:
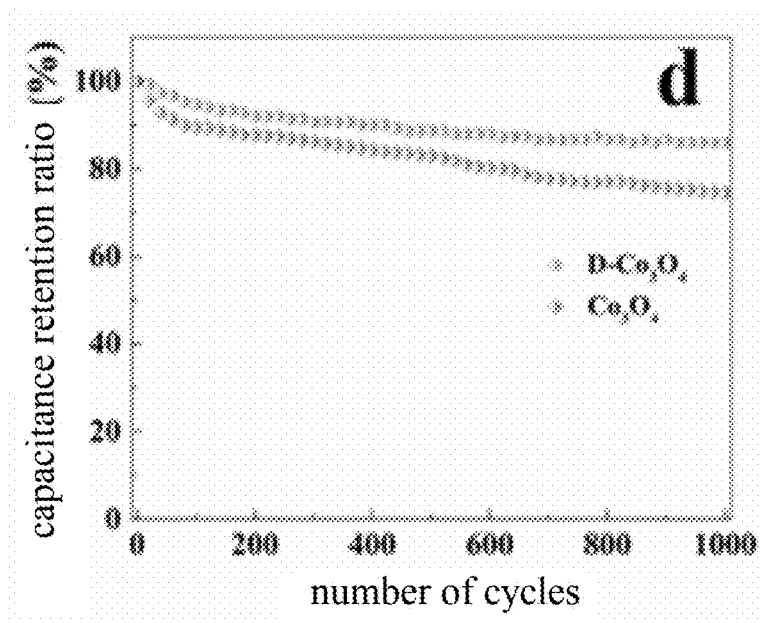
FIG. 12 is a 1000 cycles stability test curve of the nickel foam-supported tricobalt tetroxide nanomaterials obtained in Examples 1 and 3 of the present invention.

The test results are shown in FIGS. 9-12. As shown in FIGS. 9-12, the D-$Co_3O_4$ electrode material prepared in Example 1 also exhibits excellent electrochemical performance at low temperatures (ice-water mixture). FIG. 9 is a comparison image of cyclic voltammetry curves of D-$Co_3O_4$ and $Co_3O_4$ electrodes at 5 mV s$^{-1}$. Obviously, the closed area of the integral curve of D-$Co_3O_4$ is larger than that of $Co_3O_4$, indicating that it can store more capacitance. The GCD image at 1 mA cm$^{-2}$ in FIG. 10 also obtains similar results, wherein the discharge time of the D-$Co_3O_4$ electrode is longer. FIG. 11 shows the specific capacitances of D-$Co_3O_4$ and $Co_3O_4$ at different current densities. The results show that when the current density is 1 mA cm$^{-2}$, the specific capacitance of D-$Co_3O_4$ is 1052 mF cm$^{-2}$, and the specific capacitance of $Co_3O_4$ is 338 mF cm$^{-2}$. When the current density is increased to 10 mA cm$^2$, the specific capacitance of D-$Co_3O_4$ is always superior to that of $Co_3O_4$. Stability is one of the important indicators to measure the practicality of electrodes. After 1000 cycles under the condition of 10 A g$^{-1}$ (FIG. 12), the prepared D-$Co_3O_4$ still retains 86% of the initial specific capacitance, whereas $Co_3O_4$ only retains 74% after 1000 cycles, indicating that D-$Co_3O_4$ has good cycle stability.

Described above are only preferred specific embodiments of the present application, but the scope of protection of the present application is not limited thereto. Any change or replacement that can be easily conceived by those skilled in the art within the technical scope disclosed in the present application shall be covered within the scope of protection of the present application. Therefore, the scope of protection of the present application shall be subject to the scope of protection of the claims.

The invention claimed is:

1. A method for preparing a nickel foam-supported defective tricobalt tetraoxide nanomaterial, comprising the following steps:
   dissolving cobalt acetate in an ethylene glycol solution and stirring uniformly to obtain a pink transparent solution;
   adding hexadecyl trimethyl ammonium bromide to the pink transparent solution, and stirring until the hexadecyl trimethyl ammonium bromide dissolves to obtain a mixed solution;
   putting the mixed solution into a teflon-lined reactor, and adding pretreated nickel foam to the reactor for reaction, washing the nickel foam obtained after reaction repeatedly and then drying;
   heat-treating the nickel foam composite material obtained after drying;
   wherein the defective tricobalt tetraoxide has an increased d-spacing than non-defective cobalt tetraoxide, (311) diffraction peak of the defective tricobalt tetraoxide in XRD spectrum is moved to a lower angle than non-defective cobalt tetraoxide, and (311) characteristic peak of the defective tricobalt tetraoxide in XRD spectrum is broadened than non-defective cobalt tetraoxide.

2. The method for preparing a nickel foam-supported defective tricobalt tetraoxide nanomaterial according to claim 1, wherein the step of pretreating the nickel foam comprises:

cutting the foam nickel into pieces, ultrasonic cleaning the pieces in hydrochloric acid, ethanol and an aqueous solution in sequence, and then drying them.

3. The method for preparing a nickel foam-supported defective tricobalt tetraoxide nanomaterial according to claim 2, wherein a drying temperature in the step of pretreating the nickel foam is 60-80° C.

4. The method for preparing a nickel foam-supported defective tricobalt tetraoxide nanomaterial according to claim 3, wherein a duration of the ultrasonic clean is 10-15 minutes.

5. The method for preparing a nickel foam-supported defective tricobalt tetraoxide nanomaterial according to claim 1, wherein process conditions of the heat-treating are as follows: the temperature is 500-700° C., a heating rate is controlled at 2-5 $\min^{-1}$, and a treatment time is 2-5 hours.

6. The method for preparing a nickel foam-supported defective tricobalt tetraoxide nanomaterial according to claim 1, wherein a reaction temperature in the teflon-lined reactor is 200-300° C., and a reaction time is 8-10 hours.

* * * * *